(12) United States Patent  (10) Patent No.: US 10,630,323 B2
Spring et al.  (45) Date of Patent: Apr. 21, 2020

(54) ASYMMETRIC ADJACENT CHANNEL LEAKAGE RATIO (ACLR) CONTROL

(71) Applicant: QUALCOMM Incorporated, San Diego, CA (US)

(72) Inventors: Ryan Scott Castro Spring, San Diego, CA (US); Sanjay Avasarala, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 5 days.

(21) Appl. No.: 15/959,771

(22) Filed: Apr. 23, 2018

(65) Prior Publication Data

US 2019/0326942 A1  Oct. 24, 2019

(51) Int. Cl.
*H04B 15/00* (2006.01)
*H04B 1/04* (2006.01)
*H04L 25/06* (2006.01)

(52) U.S. Cl.
CPC .......... *H04B 1/0458* (2013.01); *H04L 25/06* (2013.01); *H04B 2001/0425* (2013.01)

(58) Field of Classification Search
CPC .......... H04B 1/0458; H04B 2001/0425; H04L 25/06
USPC .......... 455/501, 53.1, 67.13, 114.3; 375/296
See application file for complete search history.

(56) References Cited

U.S. PATENT DOCUMENTS

| | | |
|---|---|---|
| 7,342,444 B2 | 3/2008 | Kim et al. |
| 9,048,797 B2 | 6/2015 | Kim et al. |
| 9,306,506 B1 * | 4/2016 | Zhang .................. H03F 1/3247 |
| 9,571,135 B2 | 2/2017 | Langer |
| 2006/0240786 A1 * | 10/2006 | Liu .................. H03F 1/3247 455/114.3 |
| 2012/0119811 A1 * | 5/2012 | Bai .................. H03F 1/3247 327/317 |
| 2014/0140250 A1 * | 5/2014 | Kim .................. H04B 1/525 370/278 |
| 2015/0323964 A1 * | 11/2015 | Ichitsubo .......... H03G 3/3036 361/679.4 |

(Continued)

OTHER PUBLICATIONS

Jin S., et al., "Control of IMD Asymmetry of CMOS Power Amplifier for Broadband Operation Using Wideband Signal", IEEE Transactions on Microwave Theory and Techniques, vol. 61, No. 10, Oct. 2013, pp. 3753-3762.

(Continued)

*Primary Examiner* — Sonny Trinh
(74) *Attorney, Agent, or Firm* — Patterson & Sheridan, L.L.P./QUALCOMM Incorporated

(57) ABSTRACT

Certain aspects of the present disclosure introduce transmit chain asymmetry to meet tighter specifications of a band on one side of a spectrum while sacrificing emissions margin of a band on the opposite side of the spectrum. One example apparatus generally includes a distortion module configured to generate an input signal, and an amplifier coupled to the distortion module and configured to generate an amplified signal based on the input signal. In certain aspects, the input signal is generated such that a power of the amplified signal at a first bandwidth is skewed relative to a power of the amplified signal at a second bandwidth, the first and second bandwidths being adjacent to a main channel bandwidth of the amplified signal.

30 Claims, 8 Drawing Sheets

(56) References Cited

U.S. PATENT DOCUMENTS

| | | | | |
|---|---|---|---|---|
| 2015/0326378 A1* | 11/2015 | Zhang | ............... | H04W 76/14 |
| | | | | 370/280 |
| 2016/0028421 A1* | 1/2016 | Kakinuma | ........... | H04B 1/0475 |
| | | | | 375/296 |
| 2017/0077879 A1 | 3/2017 | Ma et al. | | |
| 2017/0353199 A1* | 12/2017 | Kim | ................ | H04B 1/0475 |
| 2018/0102747 A1* | 4/2018 | Kim | .................. | H03F 1/3247 |

OTHER PUBLICATIONS

3GPP TS 36.101: "3rd Generation Partnership Project; Technical Specification Group Radio Access Network; Evolved Universal Terrestrial Radio Access (E-UTRA); User Equipment (UE) Radio Transmission and Reception (Release 14)", V14.2.1, Jan. 2017, 1262 Pages Brinkhoff J., et al., "Baseband Impedance and Linearization of FET Circuits," IEEE Transactions on Microwave Theory and Techniques, Dec. 2003, vol. 51, No. 12, pp. 2523-2530.

Jin S., et al., "Linearization of CMOS Cascode Power Amplifiers Through Adaptive Bias Control," IEEE Transactions on Microwave Theory and Techniques, Dec. 2013, vol. 61, No. 12, pp. 4534-4543.

Takenaka I., et al., "Improvement of Intermodulation Distortion Asymmetry Characteristics With Wideband Microwave Signals in High Power Amplifiers," IEEE Transactions on Microwave Theory and Techniques, Jun. 2008, vol. 56, No. 6, pp. 1355-1363.

* cited by examiner

ASYMMETRIC ADJACENT CHANNEL LEAKAGE RATIO (ACLR) CONTROL

TECHNICAL FIELD

Certain aspects of the present disclosure generally relate to electronic circuits and, more particularly, to radio frequency (RF) front-end circuitry.

BACKGROUND

A wireless communication network may include a number of base stations that can support communication for a number of mobile stations. A mobile station (MS) may communicate with a base station (BS) via a downlink and an uplink. The downlink (or forward link) refers to the communication link from the base station to the mobile station, and the uplink (or reverse link) refers to the communication link from the mobile station to the base station. A base station may transmit data and control information on the downlink to a mobile station and/or may receive data and control information on the uplink from the mobile station. The base station and/or mobile station may include radio frequency (RF) front-end circuitry. The RF front-end circuitry may include one or more power amplifiers for amplifying a signal for transmission.

SUMMARY

Certain aspects of the present disclosure introduce transmit chain asymmetry to meet tighter specifications of a band on one side of a spectrum while sacrificing emissions margin of a band on the opposite side of the spectrum.

Certain aspects of the present disclosure provide an apparatus for wireless communication. The apparatus generally includes a distortion module configured to generate an input signal and an amplifier coupled to the distortion module and configured to generate an amplified signal based on the input signal, the input signal being generated such that a power of the amplified signal at a first bandwidth is skewed relative to a power of the amplified signal at a second bandwidth, the first and second bandwidths being adjacent to a main channel bandwidth of the amplified signal.

Certain aspects of the present disclosure provide a method for wireless communication. The method generally includes generating an input signal and amplifying a radio-frequency (RF) signal to generate an amplified RF signal based on the input signal, the input signal being generated such that a power of the amplified RF signal at a first bandwidth is skewed relative to a power of the amplified RF signal at a second bandwidth, the first and second bandwidths being adjacent to a main channel bandwidth of the amplified RF signal.

Certain aspects of the present disclosure provide an apparatus for wireless communication. The apparatus generally includes means for generating an input signal and means for amplifying a radio-frequency (RF) signal to generate an amplified RF signal based on the input signal, the input signal being generated such that a power of the amplified RF signal at a first bandwidth is skewed relative to a power of the amplified RF signal at a second bandwidth, the first and second bandwidths being adjacent to a main channel bandwidth of the amplified RF signal.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

As used herein, the term "connected with" in the various tenses of the verb "connect" may mean that element A is directly connected to element B or that other elements may be connected between elements A and B (i.e., that element A is indirectly connected with element B). In the case of electrical components, the term "connected with" may also be used herein to mean that a wire, trace, or other electrically conductive material is used to electrically connect elements A and B (and any components electrically connected therebetween).

An Example Wireless System

Figure 1:
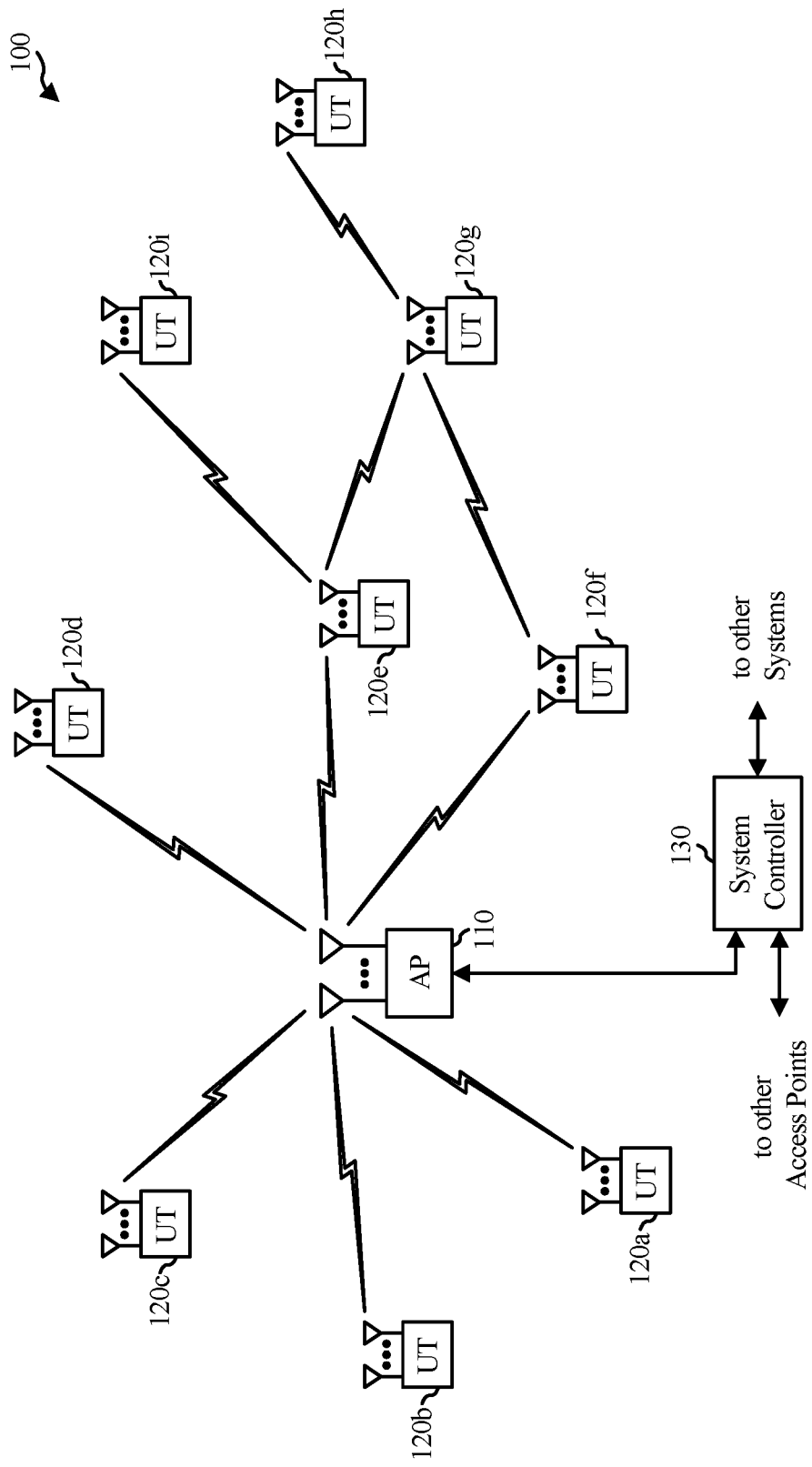
FIG. 1 is a diagram of an example wireless communications network, in accordance with certain aspects of the present disclosure.

FIG. 1 illustrates a wireless communications system 100 with access points 110 and user terminals 120, in which aspects of the present disclosure may be practiced. For simplicity, only one access point 110 is shown in FIG. 1. An access point (AP) is generally a fixed station that communicates with the user terminals and may also be referred to as a base station (BS), an evolved Node B (eNB), or some other terminology. A user terminal (UT) may be fixed or mobile and may also be referred to as a mobile station (MS), an access terminal, user equipment (UE), a station (STA), a client, a wireless device, or some other terminology. A user terminal may be a wireless device, such as a cellular phone, a personal digital assistant (PDA), a handheld device, a wireless modem, a laptop computer, a tablet, a personal computer, etc.

Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

Wireless communications system 100 employs multiple transmit and multiple receive antennas for data transmission on the downlink and uplink. Access point 110 may be equipped with a number $N_{ap}$ of antennas to achieve transmit diversity for downlink transmissions and/or receive diversity for uplink transmissions. A set $A_T$ of selected user terminals 120 may receive downlink transmissions and transmit uplink transmissions. Each selected user terminal transmits user-specific data to and/or receives user-specific data from the access point. In general, each selected user terminal may be equipped with one or multiple antennas (i.e., $N_{ut} \geq 1$). The $N_u$ selected user terminals can have the same or different number of antennas.

Wireless communications system 100 may be a time division duplex (TDD) system or a frequency division duplex (FDD) system. For a TDD system, the downlink and uplink share the same frequency band. For an FDD system, the downlink and uplink use different frequency bands. Wireless communications system 100 may also utilize a single carrier or multiple carriers for transmission. Each user terminal 120 may be equipped with a single antenna (e.g., to keep costs down) or multiple antennas (e.g., where the additional cost can be supported). In certain aspects of the present disclosure, the access point 110 and/or user terminal 120 may include at least one transmit chain, the adjacent channel leakage ratio (ACLR) of which may be skewed as described in more detail herein.

Figure 2:
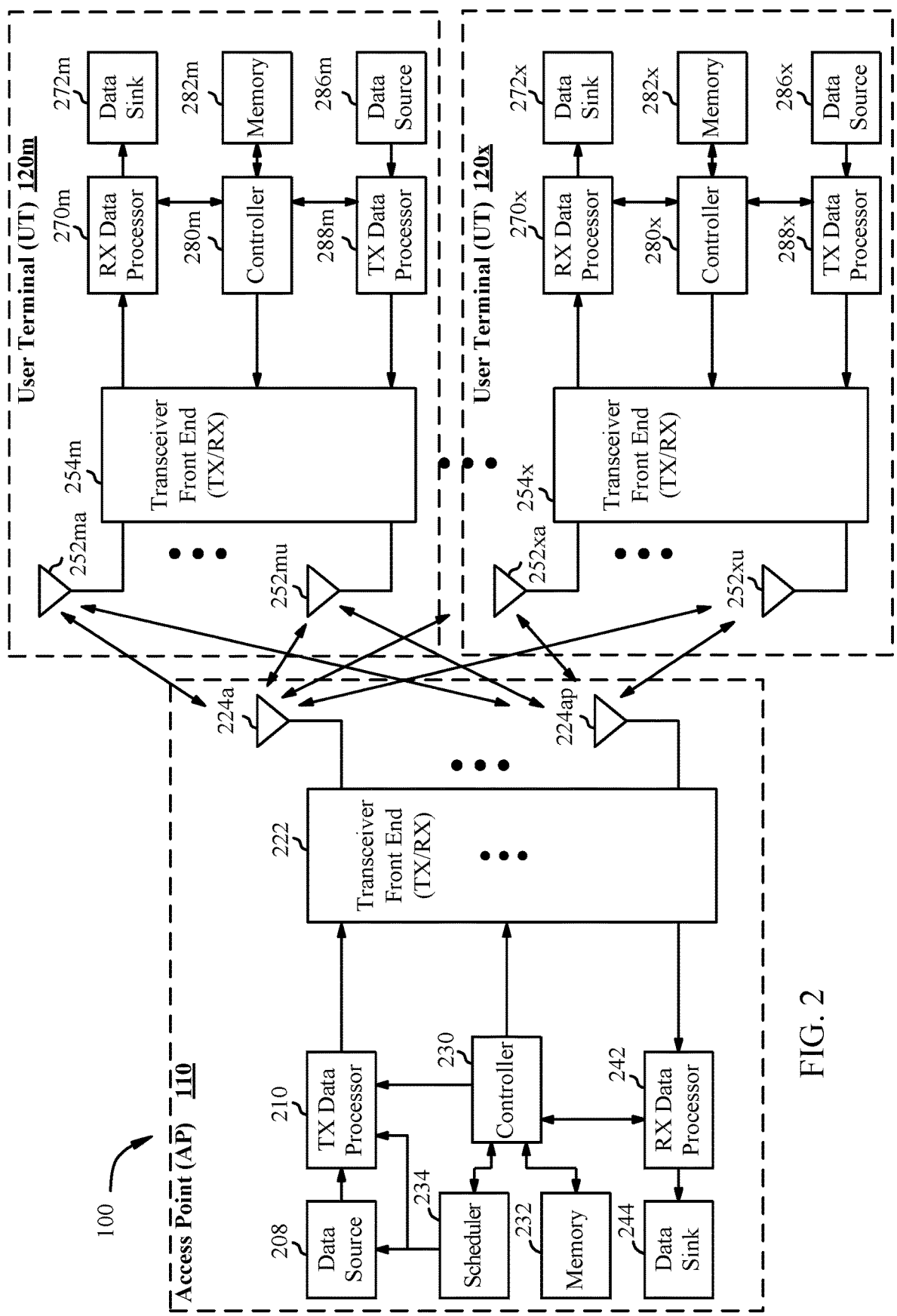
FIG. 2 is a block diagram of an example access point (AP) and example user terminals, in accordance with certain aspects of the present disclosure.

FIG. 2 shows a block diagram of access point 110 and two user terminals 120m and 120x in the wireless communications system 100. Access point 110 is equipped with $N_{ap}$ antennas 224a through 224ap. User terminal 120m is equipped with $N_{ut,m}$ antennas 252ma through 252mu, and user terminal 120x is equipped with $N_{ut,x}$ antennas 252xa through 252xu. Access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a frequency channel, and a "receiving entity" is an independently operated apparatus or device capable of receiving data via a frequency channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. Beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data $\{d_{up}\}$ for the user terminal based on the coding and modulation schemes associated with the rate selected for the user terminal and provides a data symbol stream $\{s_{up}\}$ for one of the $N_{ut,m}$ antennas. A transceiver front end (TX/RX) 254 (also known as a radio frequency front end (RFFE)) receives and processes (e.g., converts to analog, amplifies, filters, and frequency upconverts) a respective symbol stream to generate an uplink signal. The transceiver front end 254 may also route the uplink signal to one of the $N_{ut,m}$ antennas for transmit diversity via an RF switch, for example. The controller 280 may control the routing within the transceiver front end 254. Memory 282 may store data and program codes for the user terminal 120 and may interface with the controller 280.

A number $N_{up}$ of user terminals 120 may be scheduled for simultaneous transmission on the uplink. Each of these user terminals transmits its set of processed symbol streams on the uplink to the access point.

At access point 110, $N_{ap}$ antennas 224a through 224ap receive the uplink signals from all $N_{up}$ user terminals transmitting on the uplink. For receive diversity, a transceiver front end 222 may select signals received from one of the antennas 224 for processing. The signals received from multiple antennas 224 may be combined for enhanced receive diversity. The access point's transceiver front end 222 also performs processing complementary to that performed by the user terminal's transceiver front end 254 and provides a recovered uplink data symbol stream. The recovered uplink data symbol stream is an estimate of a data symbol stream $\{s_{up}\}$ transmitted by a user terminal. An RX data processor 242 processes (e.g., demodulates, deinterleaves, and decodes) the recovered uplink data symbol stream in accordance with the rate used for that stream to obtain decoded data. The decoded data for each user terminal may be provided to a data sink 244 for storage and/or a controller 230 for further processing. The transceiver front end (TX/RX) 222 of access point 110 and/or transceiver front end 254 of user terminal 120 may include at least one transmit chain, the ACLR of which may be skewed as described in more detail herein.

On the downlink, at access point 110, a TX data processor 210 receives traffic data from a data source 208 for $N_{dn}$ user terminals scheduled for downlink transmission, control data from a controller 230 and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 may provide a downlink data symbol streams for one of more of the $N_{dn}$ user terminals to be transmitted from one of the $N_{ap}$ antennas. The transceiver front end 222 receives and processes (e.g., converts to analog, amplifies, filters, and frequency upconverts) the symbol stream to generate a downlink signal. The transceiver front end 222 may also route the downlink signal to one or more of the $N_{ap}$ antennas 224 for transmit diversity via an RF switch, for example. The controller 230 may control the routing within the transceiver front end 222. Memory 232 may store data and program codes for the access point 110 and may interface with the controller 230.

At each user terminal 120, $N_{ut,m}$ antennas 252 receive the downlink signals from access point 110. For receive diversity at the user terminal 120, the transceiver front end 254 may select signals received from one of the antennas 252 for processing. The signals received from multiple antennas 252 may be combined for enhanced receive diversity. The user terminal's transceiver front end 254 also performs processing complementary to that performed by the access point's transceiver front end 222 and provides a recovered downlink data symbol stream. An RX data processor 270 processes (e.g., demodulates, deinterleaves, and decodes) the recovered downlink data symbol stream to obtain decoded data for the user terminal.

Figure 3:
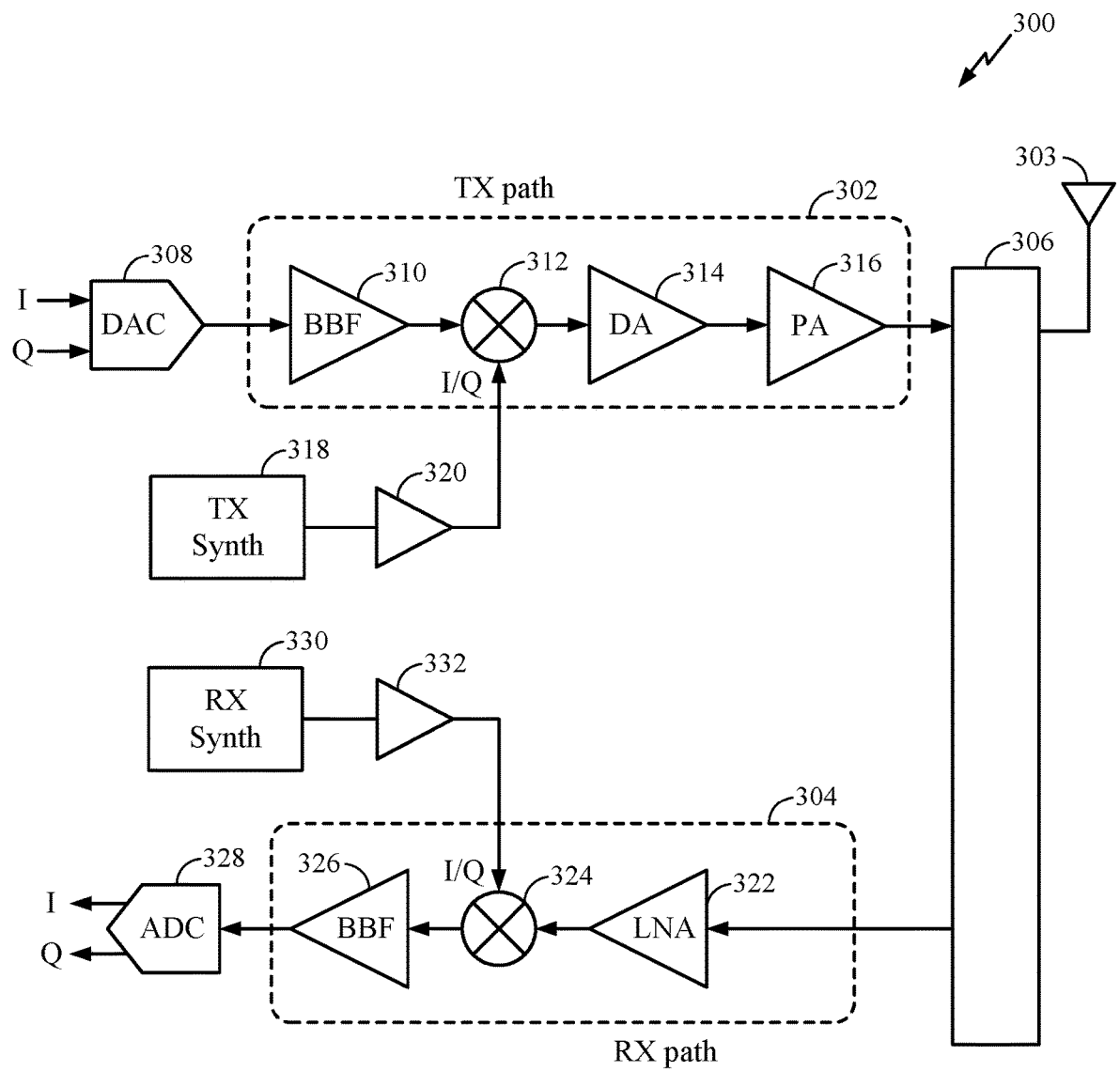
FIG. 3 is a block diagram of an example transceiver front end, in accordance with certain aspects of the present disclosure.

FIG. 3 is a block diagram of an example transceiver front end 300, such as transceiver front ends 222, 254 in FIG. 2, in which aspects of the present disclosure may be practiced. The transceiver front end 300 includes a transmit (TX) path 302 (also known as a transmit chain) for transmitting signals via one or more antennas and a receive (RX) path 304 (also known as a receive chain) for receiving signals via the antennas. When the TX path 302 and the RX path 304 share an antenna 303, the paths may be connected with the antenna via an interface 306, which may include any of various suitable RF devices, such as a duplexer, a switch, a diplexer, and the like.

Receiving in-phase (I) or quadrature (Q) baseband analog signals from a digital-to-analog converter (DAC) 308, the TX path 302 may include a baseband filter (BBF) 310, a mixer 312, a driver amplifier (DA) 314, and a power amplifier (PA) 316. The BBF 310, the mixer 312, and the DA 314 may be included in a radio frequency integrated circuit (RFIC), while the PA 316 may be external to the RFIC. The BBF 310 filters the baseband signals received from the DAC 308, and the mixer 312 mixes the filtered baseband signals with a transmit local oscillator (LO) signal to convert the baseband signal of interest to a different frequency (e.g., upconvert from baseband to RF). This frequency conversion process produces the sum and difference frequencies of the LO frequency and the frequency of the signal of interest. The sum and difference frequencies are referred to as the beat frequencies. The beat frequencies are typically in the RF range, such that the signals output by the mixer 312 are typically RF signals, which may be amplified by the DA 314 and/or by the PA 316 before transmission by the antenna 303.

The RX path 304 includes a low noise amplifier (LNA) 322, a mixer 324, and a baseband filter (BBF) 326. The LNA 322, the mixer 324, and the BBF 326 may be included in a radio frequency integrated circuit (RFIC), which may or may not be the same RFIC that includes the TX path components. RF signals received via the antenna 303 may be amplified by the LNA 322, and the mixer 324 mixes the amplified RF signals with a receive local oscillator (LO) signal to convert the RF signal of interest to a different baseband frequency (i.e., downconvert). The baseband signals output by the mixer 324 may be filtered by the BBF 326 before being converted by an analog-to-digital converter (ADC) 328 to digital I or Q signals for digital signal processing. In certain aspects of the present disclosure, the ACLR of the transmit chain which includes the PA 316 may be skewed as described in more detail herein.

While it is desirable for the output of an LO to remain stable in frequency, tuning the LO to different frequencies typically entails using a variable-frequency oscillator, which involves compromises between stability and tunability. Contemporary systems may employ frequency synthesizers with a voltage-controlled oscillator (VCO) to generate a stable, tunable LO with a particular tuning range. Thus, the transmit LO frequency may be produced by a TX frequency synthesizer 318, which may be buffered or amplified by amplifier 320 before being mixed with the baseband signals in the mixer 312. Similarly, the receive LO frequency may be produced by an RX frequency synthesizer 330, which may be buffered or amplified by amplifier 332 before being mixed with the RF signals in the mixer 324.

Example Techniques for Asymmetric Adjacent Channel Leakage Ratio (ACLR) Control

There exist several scenarios in which an adjacent bandwidth on one side of a transmit channel has more stringent specifications for emissions than the adjacent bandwidth on the opposite side of the transmit channel. For example, some specifications may stipulate that one side of the transmission bandwidth is to have a tightened emissions threshold as compared to the other side of the transmission bandwidth. For coexistence of various bands, the specifications may state that emissions are to be under a specified threshold depending on the location of the bandwidth in the frequency domain.

Certain aspects of the present disclosure introduce transmit chain (e.g., including a power amplifier (PA)) asymmetry to meet tighter specifications on one side of the spectrum while sacrificing emissions margin on the opposite side. For example, in certain aspects, the adjacent channel leakage ratio (ACLR) of a transmit chain, which may be caused at least in part by the PA (e.g., PA 316 in FIG. 3), may be skewed such that emissions on a first adjacent bandwidth with more stringent specifications are met while sacrificing ACLR margin on a second adjacent bandwidth having less stringent specifications. In other words, instead of aiming to reduce the ACLR of the transmit chain in a symmetric manner by reducing emissions on both adjacent bands, certain aspects of the present disclosure provide techniques for reducing the ACLR of the transmit chain in an asymmetric manner by focusing on reducing emissions of one of the adjacent bands, which in some cases may raise emissions on the other one of the adjacent bands.

Figure 4:
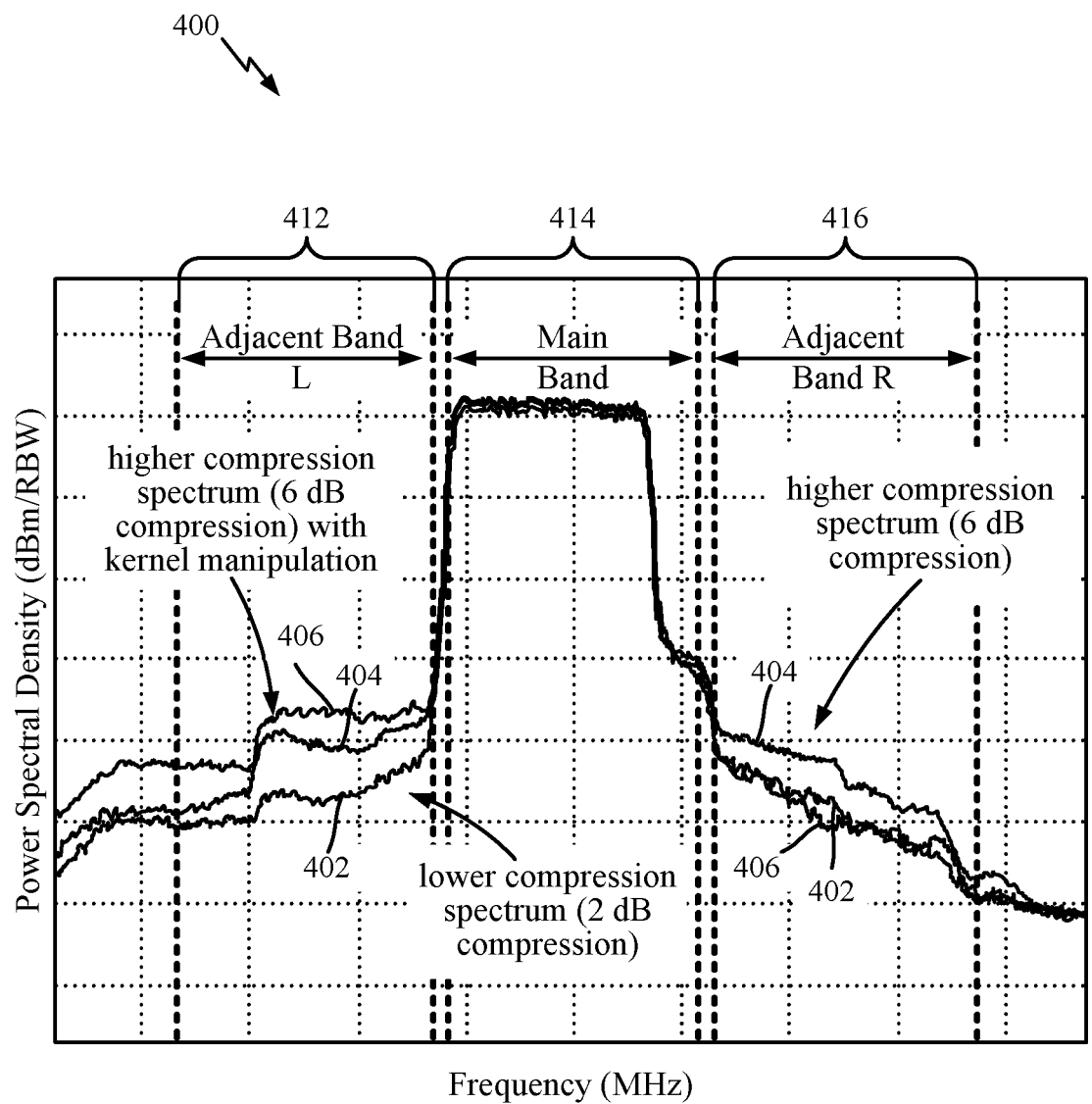
FIG. 4 is a graph illustrating an adjacent channel leakage ratio (ACLR) of an example amplifier, in accordance with certain aspects of the present disclosure.

FIG. 4 is a graph 400 illustrating the ACLR of an example PA, in accordance with certain aspects of the present disclosure. As illustrated, there may be power leakage from the main band 414 to the left (L) and right (R) adjacent bands 412 and 416 that are adjacent to the main band. There are certain specifications that set thresholds on the amount of adjacent channel (band) leakage that is tolerable. For example, there may be specifications that set the total amount of allowed adjacent channel emissions, and also set the amount of one-sided emissions allowed for each of the L and R adjacent bands 412 and 416. The techniques provided herein allow the PA design to relax the linearity specifications of the PA such that the PA can operate at a higher efficiency by allowing the average of the R and L adjacent band emissions to be above the one-sided emissions threshold as described in more detail herein.

To meet the emission limitation of the specification, the PA can be operated within a compression region of operation. For example, curve 402 illustrates the power emission of a PA operated at a 2 dB compression point. By operating a PA at a 2 dB compression point, the emission threshold set by the specification may be met, but at a cost of increased power consumption. The power consumption of the PA can be reduced by operating the PA at a 6 dB compression point corresponding to the emission power illustrated by curve 404. As illustrated, the adjacent channel leakage increases when operating the PA at a 6 dB compression point, and thus, the emission threshold set by the specification may not be met in this case. Thus, by operating the PA at a 6 dB compression point, the efficiency of the PA is increased as compared to the PA represented by curve 402, however, the emission threshold set by the specification may not be met when operating the PA at a 6 dB compression point.

In some cases, the specification for leakage thresholds that are specific to the R and L adjacent bands may be more stringent than the total emission threshold, and moreover, the leakage threshold for one adjacent band (e.g., R adjacent band 416) may be more stringent than the leakage threshold of the other adjacent band (e.g., L adjacent band 412). Thus, aspects of the present disclosure are directed to skewing the ACLR such that emissions on one adjacent band (e.g., R adjacent band 416) with more stringent specifications are met while sacrificing ACLR margin on the other adjacent band (e.g., L adjacent band 412).

For example, curve 406 illustrates the power emission of a PA operated at a 6 dB compression point with ACLR skewing. As illustrated, the power emission on the L adjacent band 412 is increased (e.g., as compared to curve 404) and the power emission of the R adjacent band 416 is decreased to meet the more stringent emission threshold of the R adjacent band 416. Therefore, by skewing the ACLR, the PA can be operated at a higher compression point, improving the efficiency of the PA, while still meeting ACLR specifications. In certain aspects, controlling the ACLR skew may be performed by altering baseband impedances at a bias node, altering the memory pre-distortion kernels to induce asymmetry, or injecting baseband signals into the RF path, as described in more detail herein.

Figure 5A:
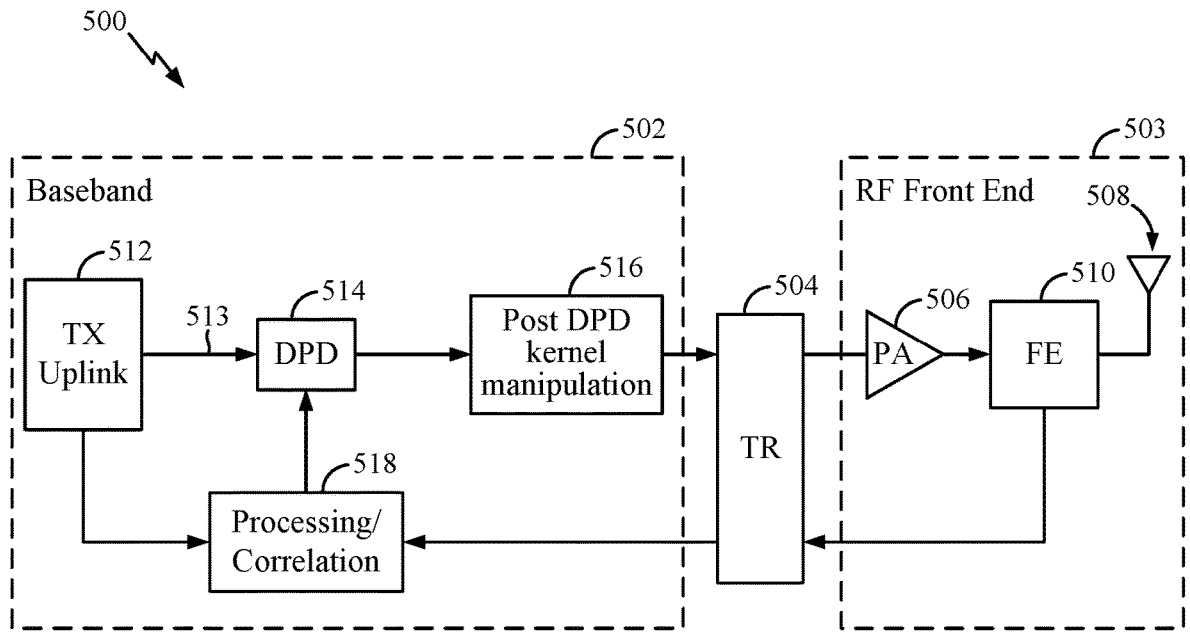
FIG. 5A illustrates an example transceiver front-end circuit configured to skew an ACLR of an amplifier, in accordance with certain aspects of the present disclosure.

FIG. 5A illustrates an example transceiver front-end circuit 500, in accordance with certain aspects of the present disclosure. As illustrated, the transceiver front-end circuit 500 includes a baseband module 502 having a transmitter 512 (e.g., TX Uplink) for generating baseband signals, which are provided to a transceiver 504 for upconversion to generate RF signals for transmission by an RF front-end module 503. The baseband module 502 may include circuitry (e.g., logic, amplifiers, and/or filters), which may be implemented as an integrated circuit (IC), to perform baseband operations as described herein. The RF front-end module 503 may include circuitry (e.g., amplifiers, mixers, filters, switches, multiplexers, and/or control logic). For example, the RF signal may then be provided to a PA 506 to be amplified and transmitted by an antenna 508 through a front-end (FE) interface 510 (which may include, for example, matching networks, filters, switches, diplexers, duplexers, etc.).

In certain aspects, the baseband module 502 may also include a digital pre-distortion (DPD) module 514 (e.g., a distortion module) for predistorting the baseband signal 513 generated by the transmitter 512 to compensate, or at least adjust, for non-linearity associated with the transmit chain including the PA 506. The DPD module 514 may include circuitry (e.g., logic, such as digital signal processing (DSP) logic) to perform pre-distortion operations (e.g., predistorting the baseband signal 513), as described herein. In certain aspects, the DPD module 514 may be implemented with a Volterra series. A Volterra series is used to model non-linear behavior of a system (e.g., the PA 506) and is able to capture memory effects which may be causing the non-linear behavior.

In some cases, a correlation module 518 may be used to correlate a baseband signal generated by the transmitter 512 with a signal-processed version (e.g., a fed back, downconverted, and digitized version) of the amplified RF signal generated by the PA 506, based on which one or more coefficients of the Volterra series may be selected. The baseband signal is then predistorted to compensate for the transmit chain non-linearity which may be caused by the PA 506. Transmit chain non-linearity causes increased emissions onto adjacent bands, increasing ACLR. For example, a non-linear input/output relationship of the PA 506 may result in the amplified output signal of the PA in the nominal transmit channel leaking into adjacent channels, as described with respect to FIG. 4. Thus, by improving the linearity of the transmit chain using DPD, ACLR is decreased. In certain aspects, the correlation module 518 may include circuitry (e.g., logic) configured to correlate signals (e.g., digital signals), as described herein.

Figure 5B:
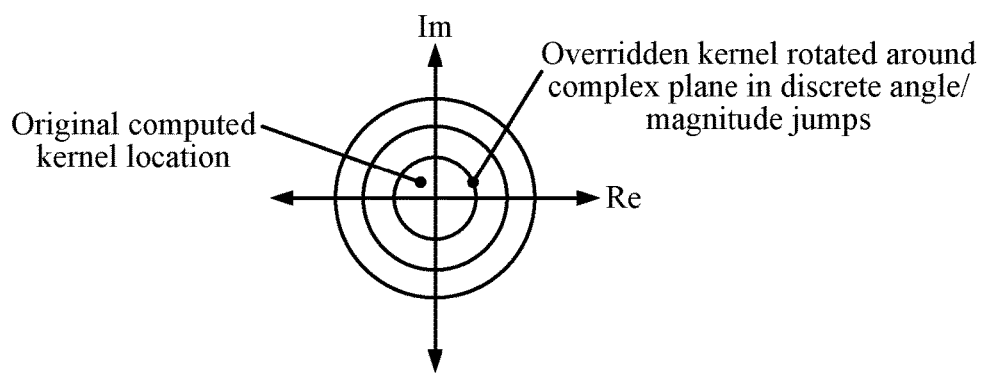
FIG. 5B is a graph illustrating rotating kernels around a complex plane, in accordance with certain aspects of the present disclosure.

Certain aspects of the present disclosure are directed to manipulating kernels of the Volterra series to skew the ACLR as described with respect to FIG. 4. The memory effects are captured by the Volterra series model using a function having a series of variables referred to as Volterra kernels. In certain aspects of the present disclosure, the kernels of the Volterra series are manipulated to adjust the predistortion of the baseband signal and skew the ACLR, as previously described. For example, a kernel manipulation module 516 may be used to sweep the kernels over angles and/or magnitudes in an effort to skew the ACLR. The kernels may be translated around the complex plane (e.g., in discrete angles and/or magnitudes), as illustrated in FIG. 5B, until set at an operating point where ACLR specifications are met for both adjacent channels, even though the ACLR is skewed such that emissions on one adjacent band are met while sacrificing ACLR margin on the other adjacent band. In certain aspects, the kernel manipulation module 516 may include circuitry (e.g., logic) for performing kernels manipulation such as sweeping kernels over angles and/or magnitudes in an effort to skew the ACLR, as described herein.

Figure 6:
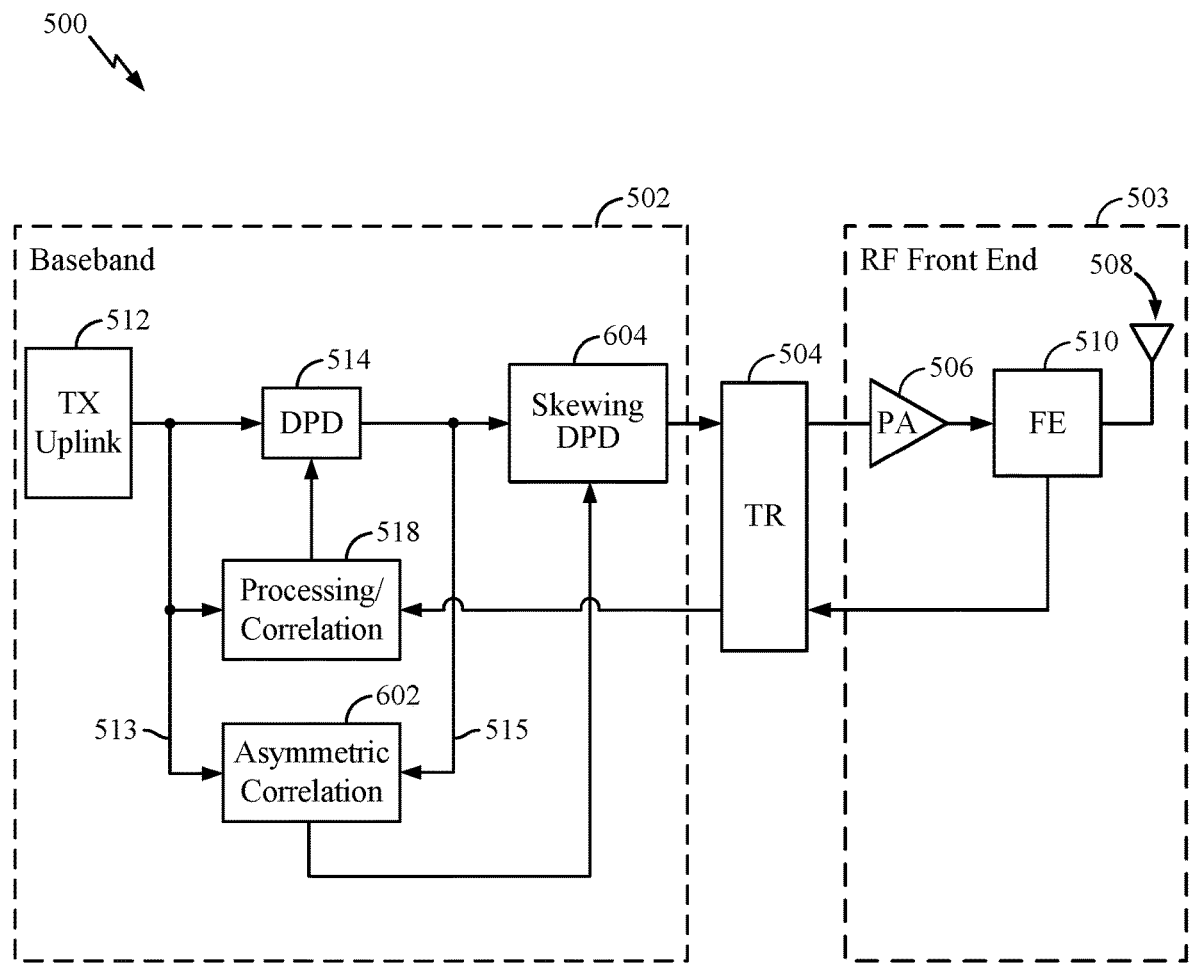
FIG. 6 illustrates an example transceiver front-end circuit implementing a closed-form pre-distortion kernel manipulation technique, in accordance with certain aspects of the present disclosure.

FIG. 6 illustrates the example transceiver front-end circuit 500 implementing a closed-form pre-distortion kernel manipulation technique, in accordance with certain aspects of the present disclosure. In this case, an asymmetric correlation module 602 may be used to perform an asymmetric correlation between the baseband signal 513 at the output of the transmitter 512 and the predistorted baseband signal 515 at the output of the DPD module 514. The asymmetric correlation module 602 may include circuitry (e.g., logic) to perform an asymmetric correlation of signals (e.g., digital signals) as described herein. The asymmetric correlation module 602 may distinguish between the adjacent bands (e.g., R and L adjacent bands) and perform a correlation of the adjacent bands in accordance with a skewing parameter indicating the amount of skewing desired between the adjacent bands. For example, the skewing parameter may be selected based on the ACLR specifications for the adjacent bands such that the emissions on one adjacent band having more stringent specifications are met while sacrificing ACLR margin on the other adjacent band. The results of the asymmetric correlation may be provided to the skewing DPD module 604. Based on the asymmetric correlation results, the skewing DPD module 604 skews the ACLR by adjusting the kernels of the Volterra series as previously described. The skewing DPD module 604 may include circuitry (e.g., logic) for skewing the ACLR by adjusting the kernels of the Volterra series, as described herein.

Figure 7:
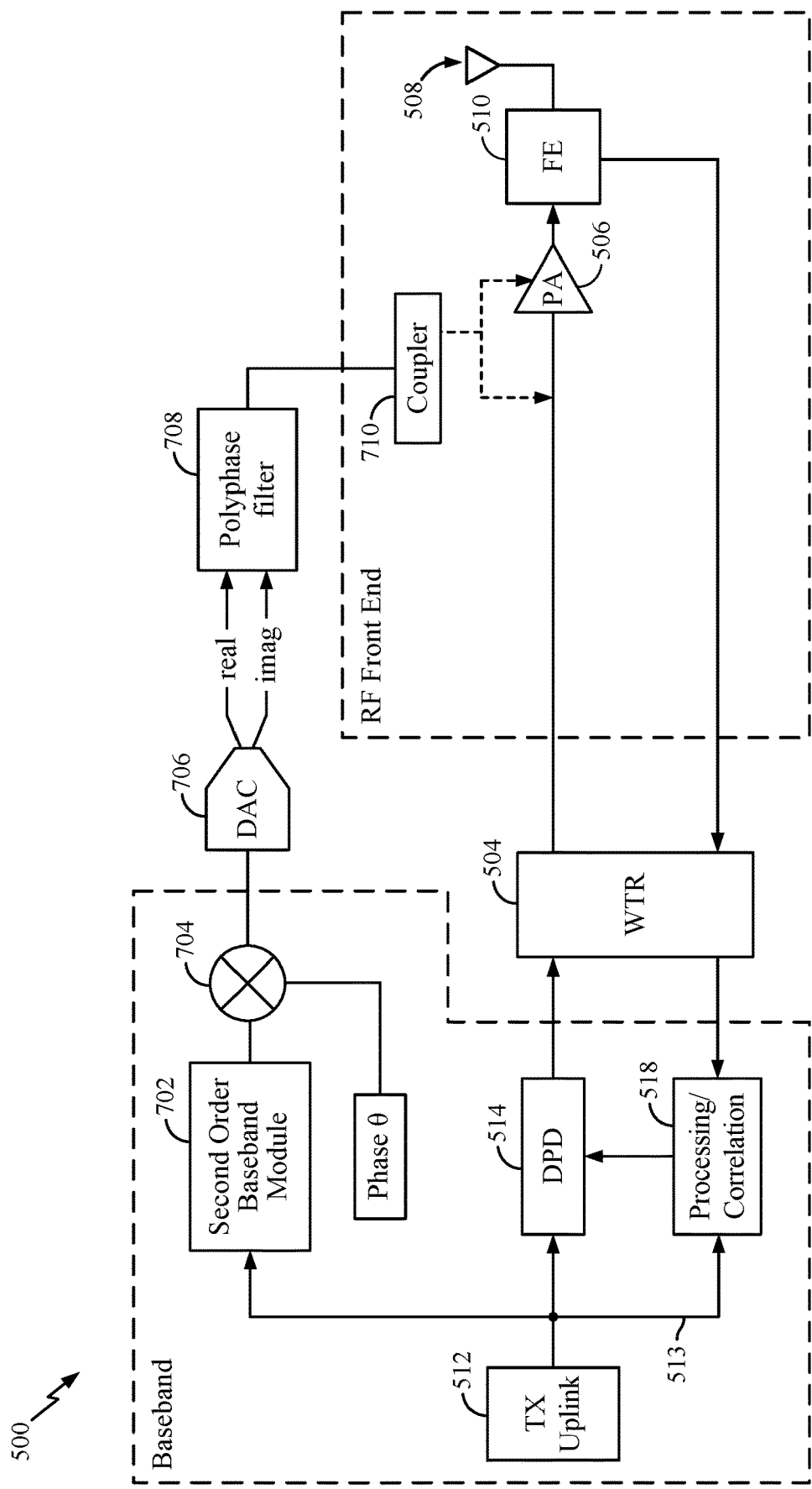
FIG. 7 illustrates a baseband injection system, in accordance with certain aspects of the present disclosure.

FIG. 7 illustrates a baseband injection system, harnessing the PA's own non-linearity to skew the spectrum, in accordance with certain aspects of the present disclosure. In this case, a signal representing the second-order component of the input baseband signal (e.g., the second-order representation of the baseband signal 513 output from the transmitter 512) is generated by the second-order baseband module 702. A phase of the signal representing the second-order component is then rotated by a phase θ via a phase adjustment module 704. The resultant signal is then converted to an analog signal via a digital-to-analog converter (DAC) 706, which generates real and imaginary component signals (e.g., in-phase (I) and quadrature (Q) signals). The real and imaginary signals are provided to a filter for combining the real and imaginary component signals to generate a combined signal. For example, the real and imaginary components may be provided to a polyphase filter 708 to be combined before being injected into an input or bias path of the PA 506 via a coupler 710. The injected signal is upconverted to the RF fundamental frequency due to the PA's own non-linearity. Thus, by rotating the phase of the signal representing the second-order component via the phase adjustment module 704, the ACLR associated with the PA may be skewed to meet the emission specifications of one adjacent band, while sacrificing emissions of another adjacent band as previously described. The second-order baseband module 702 may include circuitry (e.g., logic, amplifiers, and/or filters) for generating a signal representing the second-order component of the input baseband signal, as described herein. In addition, the phase adjustment module 704 may include circuitry (e.g., logic) for performing phase adjustment, as described herein.

In certain aspects, the ACLR skewing as described herein may be performed by altering a baseband impedance at a bias node of the PA 506. For example, an impedance of a biasing signal of the PA 506 may be adjusted at a baseband frequency to skew the ACLR of the PA 506. For a PA implemented with a field-effect transistor (FET), for example, the linearity, and resultant distortion, of the PA may be sensitive to the impedance presented to the drain of the FET at baseband frequencies. This impedance may be adjusted using, for example, an inductor-capacitor (LC) bias network, to adjust the non-linearity of the PA in a manner that skews the ACLR as described herein.

Figure 8:
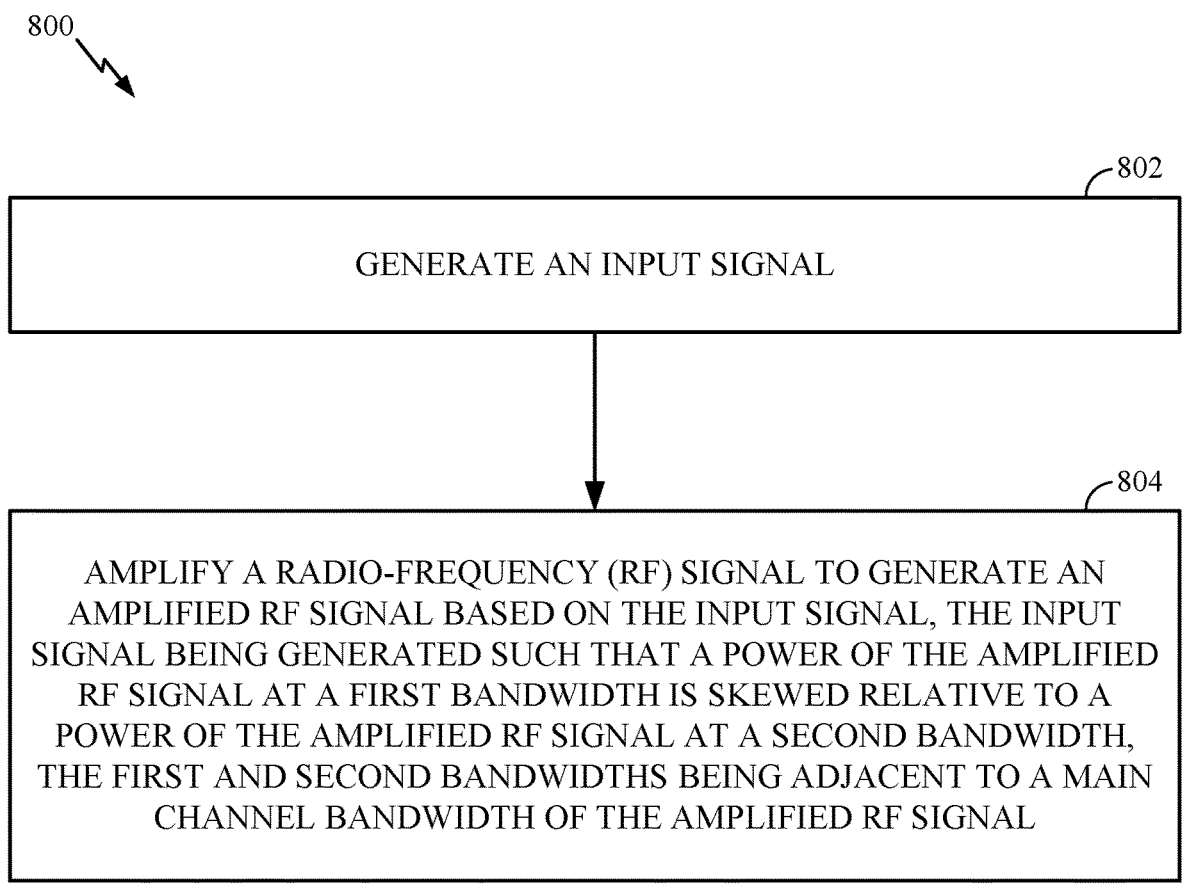
FIG. 8 is a flow diagram illustrating example operations for wireless communication, in accordance with certain aspects of the present disclosure.

FIG. 8 is a flow diagram illustrating example operations 800 for wireless communication, in accordance with certain aspects of the present disclosure. The operations 800 may be performed by a transceiver front-end circuit such as the transceiver front-end circuit 500 of FIGS. 5A, 6, and 7.

The operations 800 begin, at block 802, by generating an input signal, and at block 804, amplifying a radio-frequency (RF) signal to generate an amplified RF signal based on the input signal. In certain aspects, the input signal may be generated such that a power of the amplified RF signal at a first bandwidth (e.g., the L band as illustrated in graph 400) is skewed relative to a power of the amplified RF signal at a second bandwidth (e.g., the R band as illustrated in graph 400), the first and second bandwidths being adjacent to a main channel bandwidth (e.g., main band of graph 400) of the amplified RF signal.

In certain aspects, the input signal may be generated to compensate for non-linear effects associated with the amplification of the RF signal based on a model of the non-linear effects. For example, the model of the non-linear effects may be a Volterra series model. In certain aspects, the input signal may be generated by adjusting kernels of the Volterra series model until the power of the amplified RF signal at the first bandwidth is below a first threshold and the power of the amplified RF signal at the second bandwidth is below a second threshold. In certain aspects, the first threshold and the second threshold may be different such that the ACLR is skewed towards either the first or second bandwidths. In certain aspects, the input signal may be generated by distorting a baseband signal.

In certain aspects, the input signal may be a biasing signal. In this case, the operations 800 may include adjusting an impedance of the biasing signal at a baseband frequency, the biasing signal being used to generate the amplified RF signal. For example, the impedance may be adjusted such that the power of the amplified RF signal at the first bandwidth is skewed relative to the power of the amplified RF signal at the second bandwidth.

In certain aspects, the input signal may be generated by generating an intermediary signal based on a baseband signal, and generating the input signal based on the intermediary signal. In this case, the intermediary signal may be generated to compensate for non-linear effects associated with the amplification based on a model of the non-linear effects. Moreover, the input signal may be generated by adjusting kernels of the model of the non-linearity effects. In certain aspects, the operations 800 may also include performing an asymmetric correlation of the baseband signal and the intermediary signal. In this case, the input signal is generated based on the asymmetric correlation. In other cases, the operations 800 may also include correlating a signal-processed version of the amplified RF signal with the baseband signal. In this case, the intermediary signal may be generated based on the correlation.

In certain aspects, the input signal may be generated by generating a digital injection signal by adjusting (e.g., via the phase adjustment module 704) a phase of a second-order component of a baseband signal, and converting the digital injection signal to an analog injection signal. The analog injection signal may be coupled at a node of an amplifier used for the amplification such that the power of the amplified RF signal at the first bandwidth is skewed relative to the power of the amplified RF signal at the second bandwidth. In certain aspects, the analog injection signal may include real and imaginary components. In this case, the input signal may be further generated by combining (e.g., via the polyphase filter 708) the real and imaginary components of the analog injection signal prior to the coupling of the analog injection signal at the node.

The various operations of methods described above may be performed by any suitable means capable of performing the corresponding functions. The means may include various hardware component(s) and/or module(s), including, but not limited to one or more circuits. Generally, where there are operations illustrated in figures, those operations may have corresponding counterpart means-plus-function components with similar numbering. For example, means for generating may include a DPD module and/or a kernel manipulation module, such as the DPD module 514 and/or the kernel manipulation module 516. In certain aspects, means for amplifying may include an amplifier, such as the PA 506.

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules, and circuits described in connection with the present disclosure may be implemented or performed with discrete hardware components designed to perform the functions described herein.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communication, comprising:
   a distortion module configured to generate an input signal; and
   an amplifier coupled to the distortion module and configured to generate an amplified signal based on the input signal, the input signal being generated such that a power of the amplified signal at a first bandwidth is skewed relative to a power of the amplified signal at a second bandwidth, the first and second bandwidths being adjacent to a main channel bandwidth of the amplified signal.

2. The apparatus of claim 1, wherein:
   the input signal is generated to compensate for non-linear effects of the amplifier based on a non-linearity model of the amplifier.

3. The apparatus of claim 2, wherein:
   the non-linearity model comprises a Volterra series model; and
   the distortion module is configured to adjust one or more kernels of the Volterra series model until the power of the amplified signal at the first bandwidth is below a first threshold and the power of the amplified signal at the second bandwidth is below a second threshold.

4. The apparatus of claim 3, wherein the first threshold and the second threshold are different.

5. The apparatus of claim 3, wherein the distortion module is configured to adjust the one or more kernels of the Volterra series model in discrete steps.

6. The apparatus of claim 1, wherein the distortion module is configured to generate the input signal via a distortion of a baseband signal.

7. The apparatus of claim 1, wherein the input signal comprises a biasing signal, wherein the distortion module is configured to adjust an impedance of the biasing signal at a baseband frequency, wherein the biasing signal is provided to an output of the amplifier, and wherein the impedance is adjusted such that the power of the amplified signal at the first bandwidth is skewed relative to the power of the amplified signal at the second bandwidth.

8. The apparatus of claim 1, wherein the distortion module comprises:
   a digital pre-distortion (DPD) module configured to generate an intermediary signal based on a baseband signal; and
   a DPD skewing module configured to generate the input signal based on the intermediary signal.

9. The apparatus of claim 8, wherein the DPD module and the DPD skewing module are physically separate modules.

10. The apparatus of claim 8, wherein the DPD module is configured to generate the intermediary signal to compensate for non-linear effects of the amplifier based on a non-linearity model of the amplifier.

11. The apparatus of claim 10, wherein the DPD skewing module is configured to adjust kernels of the non-linearity model to generate the input signal.

12. The apparatus of claim 8, wherein the distortion module further comprises an asymmetric correlation module configured to correlate the baseband signal with the intermediary signal, wherein the DPD skewing module is configured to generate the input signal further based on the correlation.

13. The apparatus of claim 8, further comprising:
   a correlation module configured to correlate a signal-processed version of the amplified signal with the baseband signal, wherein the DPD module is configured to generate the intermediary signal based on the correlation.

14. The apparatus of claim 1, wherein the distortion module comprises:
   a phase adjustment module configured to generate a digital injection signal by adjusting a phase of a second-order component of a baseband signal;
   a digital-to-analog converter (DAC) configured to convert the digital injection signal to an analog injection signal; and
   a coupler configured to inject the analog injection signal at a node of the amplifier such that the power of the amplified signal at the first bandwidth is skewed relative to the power of the amplified signal at the second bandwidth.

15. The apparatus of claim 14, further comprising:
   a polyphase filter having an input coupled to an output of the DAC, and an output coupled to an input of the coupler.

16. The apparatus of claim 14, wherein the node of the amplifier comprises a bias node of the amplifier.

17. The apparatus of claim 14, wherein the node of the amplifier comprises an input node of the amplifier.

18. A method for wireless communication, comprising:
   generating an input signal; and
   amplifying a radio-frequency (RF) signal to generate an amplified RF signal based on the input signal, the input signal being generated such that a power of the amplified RF signal at a first bandwidth is skewed relative to a power of the amplified RF signal at a second bandwidth, the first and second bandwidths being adjacent to a main channel bandwidth of the amplified RF signal.

19. The method of claim 18, wherein:
the input signal is generated to compensate for non-linear effects associated with the amplification of the RF signal based on a model of the non-linear effects.

20. The method of claim 19, wherein:
the model of the non-linear effects comprises a Volterra series model; and
the input signal is generated by adjusting kernels of the Volterra series model until the power of the amplified RF signal at the first bandwidth is below a first threshold and the power of the amplified RF signal at the second bandwidth is below a second threshold, the first threshold and the second threshold being different.

21. The method of claim 18, wherein the input signal is generated by distorting a baseband signal.

22. The method of claim 18, wherein the input signal comprises a biasing signal, the method further comprising adjusting an impedance of the biasing signal at a baseband frequency, the biasing signal being used to generate the amplified RF signal, wherein the impedance is adjusted such that the power of the amplified RF signal at the first bandwidth is skewed relative to the power of the amplified RF signal at the second bandwidth.

23. The method of claim 18, wherein the input signal is generated by:
generating an intermediary signal based on a baseband signal; and
generating the input signal based on the intermediary signal.

24. The method of claim 23, wherein the intermediary signal is generated to compensate for non-linear effects associated with the amplification based on a model of the non-linear effects.

25. The method of claim 24, wherein the input signal is generated by adjusting kernels of the model of the non-linear effects.

26. The method of claim 23, further comprising:
performing an asymmetric correlation of the baseband signal and the intermediary signal, wherein the input signal is generated based on the asymmetric correlation.

27. The method of claim 23, further comprising:
correlating a signal-processed version of the amplified RF signal with the baseband signal, wherein the intermediary signal is generated based on the correlation.

28. The method of claim 18, wherein the input signal is generated by:
generating a digital injection signal by adjusting a phase of a second-order component of a baseband signal;
converting the digital injection signal to an analog injection signal; and
coupling the analog injection signal at a node of an amplifier used for the amplification such that the power of the amplified RF signal at the first bandwidth is skewed relative to the power of the amplified RF signal at the second bandwidth.

29. The method of claim 28, wherein the analog injection signal comprises real and imaginary components, the input signal being further generated by:
combining the real and imaginary components of the analog injection signal prior to the coupling of the analog injection signal at the node.

30. An apparatus for wireless communication, comprising:
means for generating an input signal; and
means for amplifying a radio-frequency (RF) signal to generate an amplified RF signal based on the input signal, the input signal being generated such that a power of the amplified RF signal at a first bandwidth is skewed relative to a power of the amplified RF signal at a second bandwidth, the first and second bandwidths being adjacent to a main channel bandwidth of the amplified RF signal.

* * * * *